(12) United States Patent
Kim et al.

(10) Patent No.: US 9,729,388 B2
(45) Date of Patent: Aug. 8, 2017

(54) METHOD AND APPARATUS FOR WIRELESS LINK RECOVERY BETWEEN BSS IN A WIRELESS COMMUNICATION SYSTEM

(71) Applicant: Samsung Electronics Co., Ltd., Suwon-si, Gyeonggi-do (KR)

(72) Inventors: Sang-Jin Kim, Suwon-si (KR); Hyun-Jeong Kang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 136 days.

(21) Appl. No.: 14/138,735

(22) Filed: Dec. 23, 2013

(65) Prior Publication Data

US 2014/0185434 A1 Jul. 3, 2014

(30) Foreign Application Priority Data

Jan. 2, 2013 (KR) ........................ 10-2013-0000194

(51) Int. Cl.
*G06F 11/00* (2006.01)
*H04J 1/16* (2006.01)
*H04L 1/00* (2006.01)
*H04L 12/26* (2006.01)
*H04L 12/24* (2006.01)
*H04W 24/02* (2009.01)
*H04W 24/04* (2009.01)

(52) U.S. Cl.
CPC ......... *H04L 41/0668* (2013.01); *H04W 24/02* (2013.01); *H04W 24/04* (2013.01)

(58) Field of Classification Search
CPC .... H04L 41/0668; H04W 24/02; H04W 24/04
USPC ....... 370/216, 217, 219, 220, 221, 223, 224, 370/225, 227, 228
See application file for complete search history.

(56) References Cited

U.S. PATENT DOCUMENTS

| 8,254,943 | B1 | 8/2012 | Dinan et al. |
| 2002/0077104 | A1 | 6/2002 | Chen et al. |
| 2006/0098607 | A1 | 5/2006 | Zeng et al. |
| 2007/0030809 | A1 | 2/2007 | Dayama |
| 2009/0059814 | A1* | 3/2009 | Nixon et al. .................. 370/254 |

(Continued)

FOREIGN PATENT DOCUMENTS

| JP | 2006-261893 A | 9/2006 |
| KR | 10-2008-0069844 A | 7/2008 |
| WO | 2006/052565 A2 | 5/2006 |

OTHER PUBLICATIONS

Provisional U.S. Appl. No. 61/576,902, filed on Dec. 16, 2011.*

(Continued)

*Primary Examiner* — Chuong T Ho
(74) *Attorney, Agent, or Firm* — Jefferson IP Law, LLP

(57) ABSTRACT

An operating method of a Base Station (BS) in a wireless communication system supporting a wireless link based communication between BSs is provided. The method includes, if a wireless link with a counterpart BS is interrupted, transmitting a report on the wireless link interruption to a management server, receiving information about at least one candidate BS for a detour path from the management server, determining a detour path with the counterpart BS on the basis of the information about the at least one candidate BS, and performing communication with the counterpart BS through the detour path.

29 Claims, 14 Drawing Sheets

(56) References Cited

U.S. PATENT DOCUMENTS

| | | | |
|---|---|---|---|
| 2010/0232436 A1* | 9/2010 | Fujii | H04B 7/2606 370/400 |
| 2011/0039546 A1* | 2/2011 | Narasimha | H04W 36/0055 455/423 |
| 2011/0053585 A1* | 3/2011 | Otonari | 455/422.1 |
| 2011/0269501 A1* | 11/2011 | Zhao | H04W 48/20 455/525 |
| 2012/0002537 A1* | 1/2012 | Bao | H04W 24/04 370/221 |
| 2012/0087232 A1* | 4/2012 | Hanabe et al. | 370/217 |
| 2012/0224472 A1* | 9/2012 | Kim | H04W 24/04 370/226 |
| 2012/0264430 A1* | 10/2012 | Kim | H04W 84/047 455/436 |
| 2012/0281575 A1* | 11/2012 | Iwata et al. | 370/252 |
| 2012/0314567 A1* | 12/2012 | Seo | H04W 24/04 370/228 |
| 2013/0035033 A1* | 2/2013 | Sanneck | H04W 24/04 455/9 |
| 2013/0077476 A1* | 3/2013 | Enyedi et al. | 370/225 |
| 2013/0155844 A1* | 6/2013 | Madaiah | 370/221 |
| 2013/0155847 A1* | 6/2013 | Li | H04W 24/04 370/225 |
| 2013/0329563 A1* | 12/2013 | Song et al. | 370/241 |
| 2014/0329563 A1* | 11/2014 | Jang et al. | 455/563 |
| 2015/0092570 A1* | 4/2015 | Iwata et al. | 370/248 |
| 2015/0264738 A1* | 9/2015 | Lee | H04W 76/027 370/228 |

OTHER PUBLICATIONS

Masugi Inoue et al.; Fast Recovery from Link Failures and Blackout of a Managed Wireless Mesh for NerveNet; Global Telecommunications Conference (GLOBECOM 2010); IEEE; Dec. 6-10, 2010; Japan.

* cited by examiner

METHOD AND APPARATUS FOR WIRELESS LINK RECOVERY BETWEEN BSS IN A WIRELESS COMMUNICATION SYSTEM

CROSS-REFERENCE TO RELATED APPLICATION(S)

This application claims the benefit under 35 U.S.C. §119 (a) of a Korean patent application filed on Jan. 2, 2013 in the Korean Intellectual Property Office and assigned Serial number 10-2013-0000194, the entire disclosure of which is hereby incorporated by reference.

TECHNICAL FIELD

The present disclosure relates to a wireless communication system.

BACKGROUND

To provide wireless access to a user terminal, a wireless communication system includes a Base Station (BS) that performs wireless communication with the terminal in a cell having a predetermined range. To provide effective service, an exchange of information must occur between BSs. At present, in most of communication systems, the BSs perform communication with each other through a wired link. However, connecting all of the BSs through the wired link has limitations, including technical limitations and cost limitations, because the number of BSs increases when considering a small cell environment as a future network structure. Accordingly, wireless communication between the BSs is required.

If wireless technologies are applied to communication between BSs, CAPital EXpenditure (CAPEX) and OPerating EXpenses (OPEX) can be saved, e.g., in the case of reducing the need of a network worker. However, there is a need for a way of recovering or substituting an interrupted wireless link that has occurred due to an irregular state change of a wireless environment. In the related art, methods of recovering an interrupted wireless link upon wireless link interruption are largely classified into either a table driven technique or an on-demand technique. The table driven technique is a scheme of managing state information of an alternative wireless link for connection with a neighboring BS through periodic control message exchange between BSs, and recovering an interrupted wireless link immediately upon occurrence of wireless link interruption. The on-demand technique is a scheme in which, after detecting wireless link interruption, a BS transmits a control message to all neighboring BSs to search a detour path.

Problematically, the table driven technique periodically exchanges an unnecessary control message even when a wireless link is in a normal state and, due to this, causes a waste of radio resources. Further, an overload caused by the control message exchange may increase as the number of neighboring BSs increases. The on-demand technique transmits a control message to neighboring BSs after detecting wireless link interruption, and detects a detour path after response reception. Therefore, the overhead caused by the transmitting of the control message is large, and the time required until data transmission resumes is long. Because of this, the on-demand technique is limited in its ability to support applications sensitive to a delay time.

Although wireless link communication between BSs is being considered, as described above, an adequate measure for wireless link recovery upon wireless link interruption has not yet been achieved.

Therefore, a need exists for an efficient alternative plan for wireless link recovery between BSs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages below. Accordingly, an aspect of the present disclosure is to provide an apparatus and method for effective recovery upon wireless link interruption between Base Stations (BSs) in a wireless communication system.

Another aspect of the present disclosure is to provide an apparatus and a method for, upon wireless link interruption between BSs, determining a detour path within a fast time in a wireless communication system.

Another aspect of the present disclosure is to provide an apparatus and a method for, upon wireless link interruption between BSs, minimizing the consumption of radio resources and detecting a detour path in a wireless communication system.

The above aspects are achieved by providing a method and apparatus for wireless link recovery between BSs in a wireless communication system.

In accordance with an aspect of the present disclosure, an operating method of a BS in a wireless communication system supporting a wireless link based communication between BSs is provided. The method includes, if a wireless link with a counterpart BS is interrupted, transmitting a report on the wireless link interruption to a management server, receiving information about at least one candidate BS for a detour path from the management server, determining a detour path with the counterpart BS on the basis of the information about the at least one candidate BS, and performing communication with the counterpart BS through the detour path.

In accordance with another aspect of the present disclosure, an operating method of a management server in a wireless communication system supporting a wireless link based communication between BSs is provided. The method includes, if a report on wireless link interruption between a 1st BS and a 2nd BS is received from the 1st BS, searching neighboring BSs of the 1st BS, selecting at least one candidate BS that will provide a detour path between the 1st BS and the 2nd BS, from among the neighboring BSs, and transmitting information about the at least one candidate BS to the 1st BS.

In accordance with an aspect of the present disclosure, a BS apparatus in a wireless communication system supporting a wireless link based communication between BSs is provided. The BS apparatus includes a backhaul communication unit configured to, if a wireless link with a counterpart BS is interrupted, transmit a report on the wireless link interruption to a management server, and receive information about at least one candidate BS for a detour path from the management server, a control unit configured to determine a detour path with the counterpart BS on the basis of the at least one candidate BS, and a fronthaul communication unit configured to perform communication with the counterpart BS through the detour path.

In accordance with another aspect of the present disclosure, a management server apparatus in a wireless communication system supporting a wireless link based communication between BSs is provided. The apparatus includes a control unit configured to, if a report on wireless link interruption between a 1st BS and a 2nd BS is received from the 1st BS, search neighboring BSs of the 1st BS, and select at least one candidate BS that will provide a detour path between the 1st BS and the 2nd BS, from among the neighboring BSs, and a communication unit configured to transmit information about the at least one candidate BS to the 1st BS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to an efficient detour path search technique for achieving a wireless link recovery between Base Stations. Below, the present disclosure describes a technology for effectively recovering an interrupted wireless link upon wireless link interruption between BSs in a wireless communication system. Below, the present disclosure describes a wireless link between BSs, however, the present disclosure can be applied to any plurality of nodes performing mutual communication through a wireless link, as well as the BSs.

Figure 1:
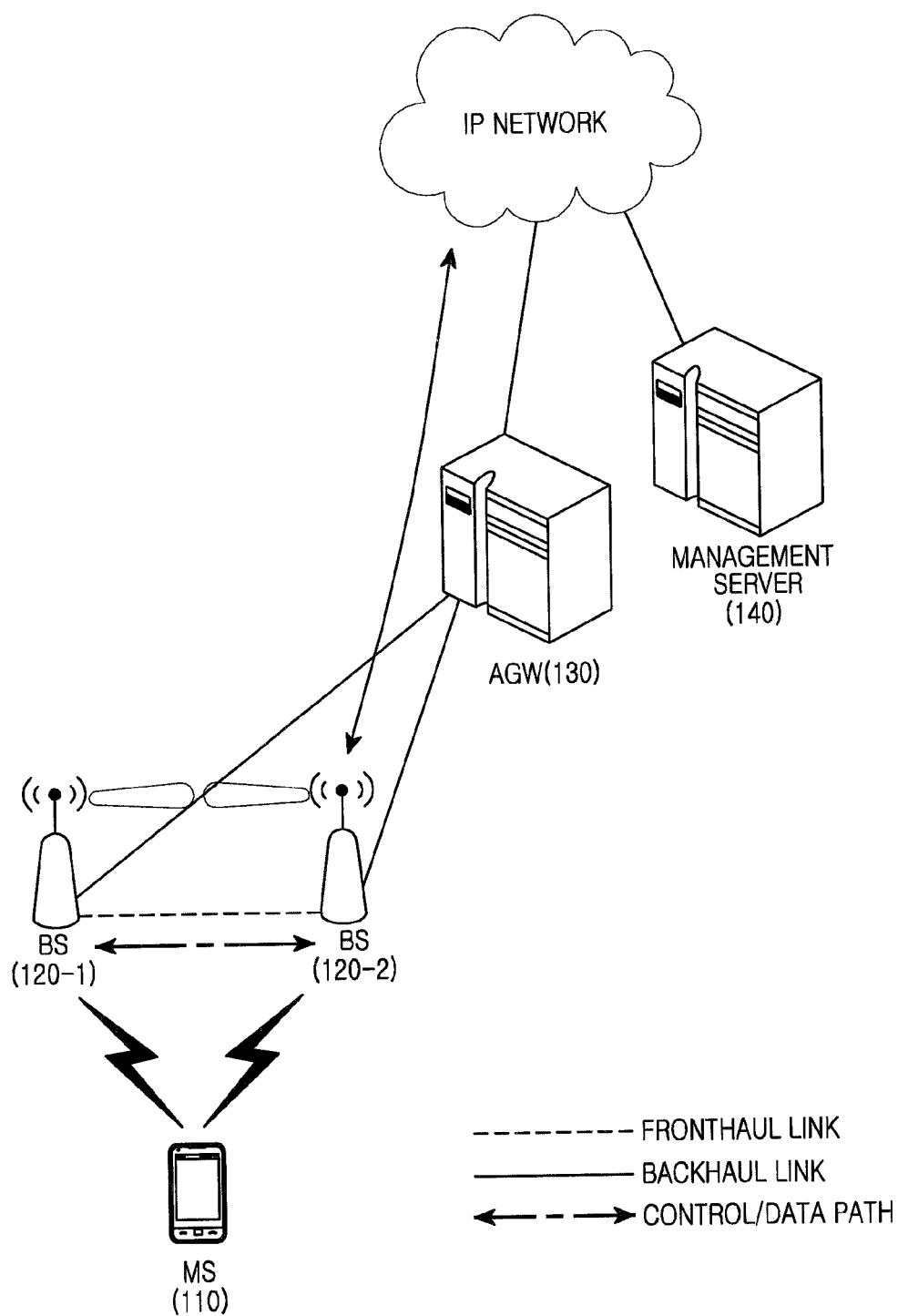
FIG. 1 is a diagram schematically illustrating a structure of a wireless communication system according to an embodiment of the present disclosure.

FIG. 1 is a diagram schematically illustrating a structure of a wireless communication system according to an embodiment of the present disclosure.

Referring to FIG. 1, the system includes a Mobile Station (MS) 110, Base Stations (BSs) 120 (i.e., 120-1 and 120-2), an Access GateWay (AGW) 130, and a management server 140.

The MS 110, which is a user device, is possessed by a user and is movable. The BSs 120 provide wireless access to the MS 110, and control a relay function for data transmission/reception of the MS 110. The AGW 130 interlocks traffic transmitted/received in the BSs 120 with an external network (e.g., an Internet Protocol (IP) network). The management server 140 manages information of a wireless link that is used for communication between the BSs 120. The management server 140 can be designated a Self Organization Network (SON) server.

The present disclosure designates a link for direct communication between the BSs 120, as "fronthaul." That is, the "fronthaul" denotes a wireless link for the direct communication between the BSs 120. In comparison, the present disclosure designates a link for communication between the BS 120 and the AGW 130 that is an upper node as "backhaul." That is, the "backhaul" denotes a wired link for the communication between the BS 120 and the AGW 130. All the BSs 120 have backhaul links.

The fronthaul, which is a wireless link directly connected between the BSs 120, substitutes an existing wired link and is used for delivery of a control message or of user data. The wireless link can be set and released dynamically between the BSs 120. For the improvement of transmission efficiency in the wireless link, the BSs 120 can use a beamforming technology. The present disclosure assumes that physical resources (e.g., RF chains, etc.) for direct communication between the BSs 120 are in an allocated state. To divide and use the physical resources, the BSs 120 can perform a procedure for logical resource allocation through a separate control message exchange. At this time, physical resources for the BSs 120 to perform wireless communication with the MS 110 and physical resources for the fronthaul can be distinguished or can be dynamically allocated using a common hardware.

The present disclosure provides a technology for overcoming a situation in which a wireless link between BSs is interrupted. Examples of situations of failing to create the wireless link between the BSs are given below:

First, because a wireless environment involves frequent changes in channel state, there is a problem of exclusively establishing a wireless link.

Second, a direct wireless link cannot be created in a case in which physical obstacles (e.g., buildings, cars, etc.) have been put where a wireless link is exists or is to be established for communication between BSs.

Third, because the number of simultaneously creatable wireless links is restricted due to limitations of hardware resources (e.g., the number of RF chains), a BS may not be able to perform direct communication with some BSs.

Accordingly, there is a need for a detour path search technique for communication between BSs. The BS cannot directly detect a detour path equal to or greater than 2-hop, when a 1-hop wireless link cannot be used for direct communication between the BSs. This is because the BS cannot know all wireless links possessed by other BSs. Accordingly, an efficient technique for providing a detour path is needed.

Figure 2:
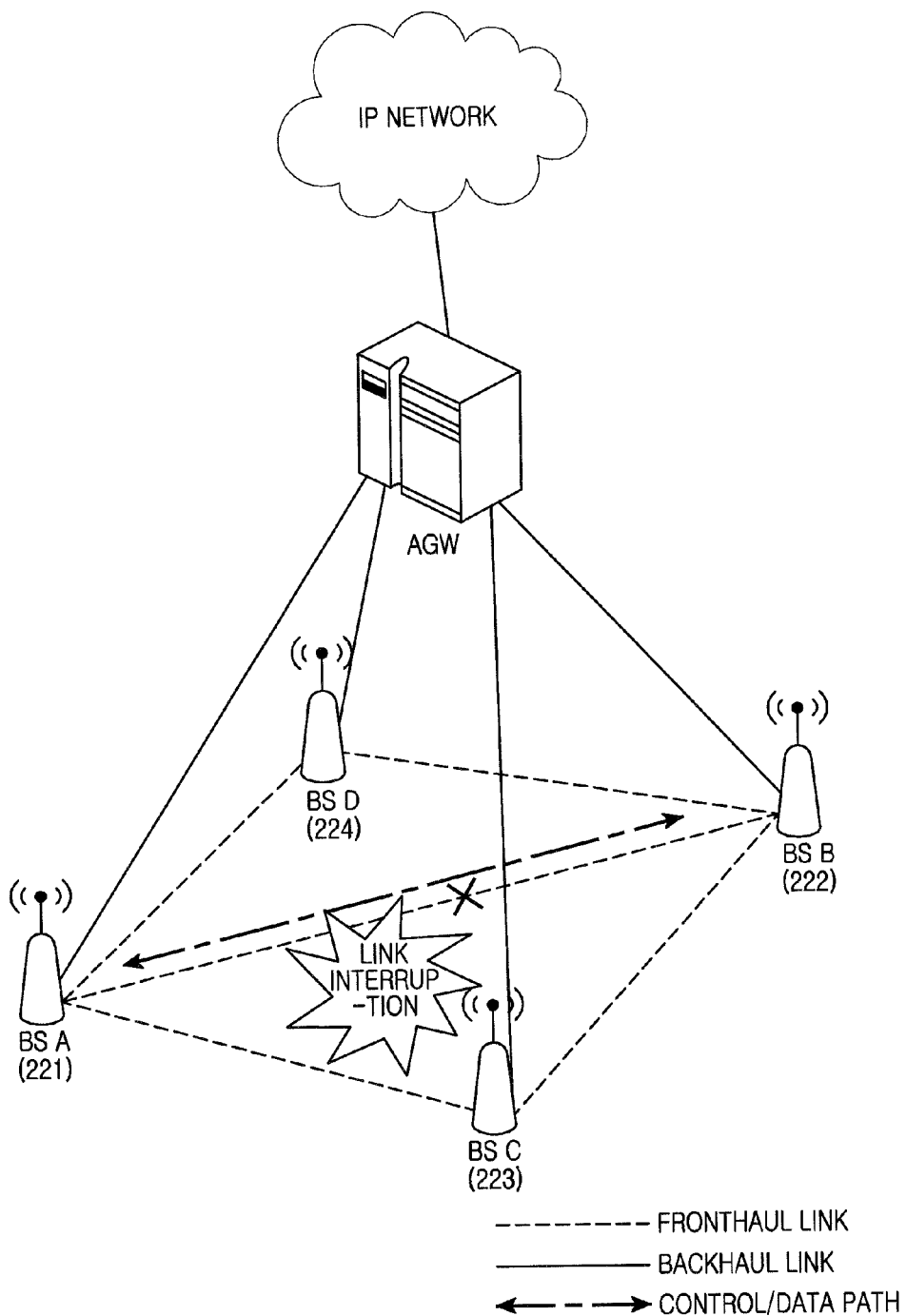
FIG. 2 is a diagram illustrating a wireless link interruption between Base Stations (BSs) in a wireless communication system according to an embodiment of the present disclosure.

FIG. 2 is a diagram illustrating a wireless link interruption between BSs in a wireless communication system according to an embodiment of the present disclosure.

Referring to FIG. 2, when a BS A 221 and a BS B 222 are communicating with each other using a 1-hop wireless link, an interruption of the 1-hop wireless link may take place. At this time, if going through a BS C 223 or a BS D 224, the BS A 221 can transmit data to the BS B 222 through a 2-hop link. However, the BS A 221 cannot determine whether it can transmit the data to the BS B 222 via BS C 223 or the BS D 224. This is because, when BSs that the BS A 221 can detect through scanning of a wireless channel are the BSs 222, 223, and 224 existing within 1-hop, the BS A 221 cannot know which one of the BSs 222, 223, and 224 has a wireless link with the BS B 222.

The following items may be considered for detour path determination.

If beamforming technology is applied, it should be implemented in consideration of a setting and a state of an RF chain possessed by each BS. Beamforming is a technology for assigning a directivity to a transmit/receive beam and increasing a gain of a signal, wherein one beam requires one RF chain. Beamforming is largely divided into digital beamforming and analog beamforming. A range of an RF chain required according to the kind of the beamforming and an implementation scheme thereof can be varied.

Accordingly, a wireless communication system using beamforming may consider an RF chain of each BS for a detour path determination. If a corresponding BS cannot use the entire RF chain because of hardware trouble, overload and the like, the corresponding BS is not able to establish a wireless link, so the corresponding BS should be excluded from being considered as an object of a detour path. Also, each RF chain possessed by a BS may have a limitation in a coverable physical region. Accordingly, if an RF chain capable of covering a specific region is in an abnormal state, a corresponding BS cannot establish a wireless link using the beamforming in the specific region. For example, an example of a situation in which wireless link establishment is impossible due to the abnormality of an RF chain is given as in FIG. 3 below.

Figure 3:
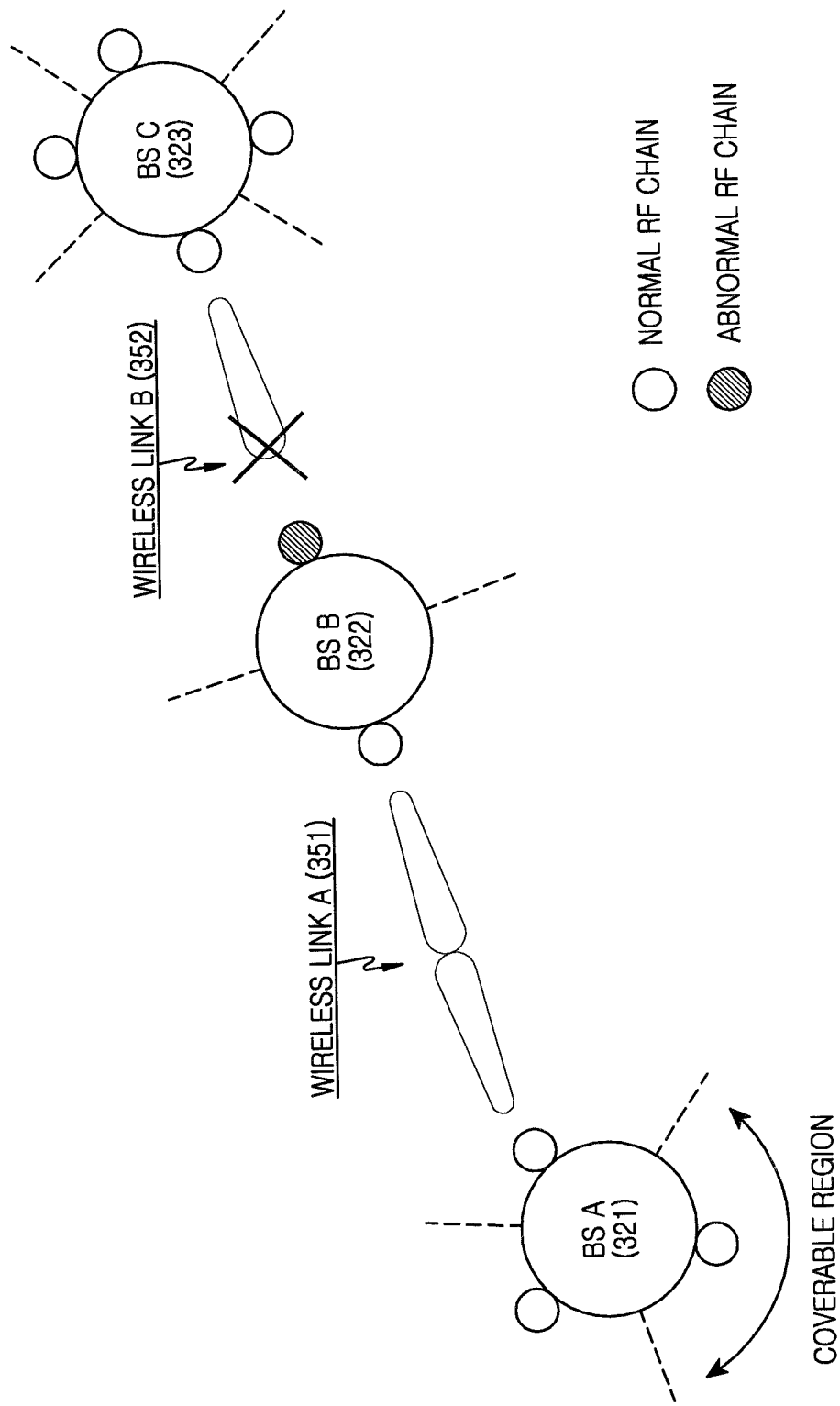
FIG. 3 is a diagram illustrating a situation in which a wireless link establishment is impossible due to a state of a Radio Frequency (RF) chain in a wireless communication system according to an embodiment of the present disclosure.

FIG. 3 is a diagram illustrating a situation in which a wireless link establishment is impossible due to a state of an RF chain in a wireless communication system according to an embodiment of the present disclosure.

Referring to FIG. 3, a BS A 321 and a BS B 322 are disposed in 1-hop communication-capable locations, and the BS B 322 and a BS C 323 are disposed in 1-hop communication-capable locations. One RF chain possessed by the BS A 321 covers a direction toward the BS B 322, and one RF chain possessed by the BS B 322 covers a direction toward the BS A 321. The RF chains facing each other are in a normal state. Therefore, a wireless link A 351 can be established between the BS A 321 and the BS B 322. In contrast, a different RF chain which may be possessed by the BS B 322 and which covers a direction toward the BS C 323 would be abnormal. Therefore, in such a case, a wireless link B 352 could not be established between the BS B 322 and the BS C 323.

The present disclosure proposes a technique of, when a 1-hop wireless link enabling direct communication between BSs is interrupted, determining a detour path equal to or greater than 2-hop between the BSs. Below, the present disclosure describes a technique of determining a detour path for a wireless link between BSs.

Figure 4:
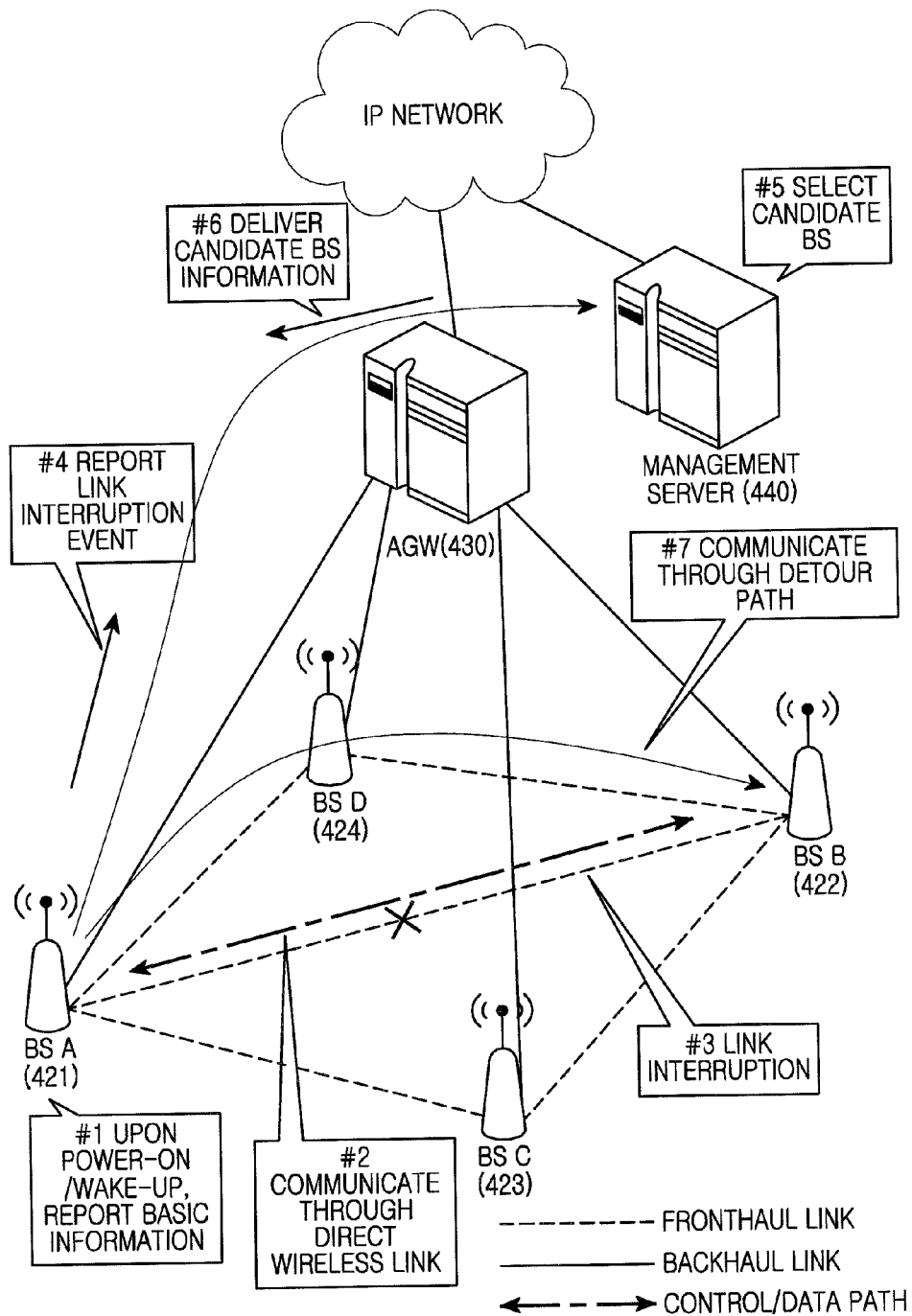
FIG. 4 is a diagram illustrating a schematic procedure for determining a detour path in a wireless communication system according to an embodiment of the present disclosure.

FIG. 4 is a diagram illustrating a schematic procedure for determining a detour path in a wireless communication system according to an embodiment of the present disclosure.

Referring to FIG. 4, after a power-on or a wake-up, all BSs 421, 422, 423, and 424 including a BS A 421 transmit their own information and information of wireless links to a management server 440. The management server 440 manages and uses the information of all the BSs for detour path detection. The BS A 421 and the BS B 422 perform direct communication with each other through a wireless link. In embodiments, the BS A 421 is a source BS, and the BS B 422 is a destination BS.

At this time, the wireless link for the direct communication between the BS A 421 and the BS B 422 is interrupted. According to this, the BS A 421 being the source BS, requests a detour path to the management server 440 by transmitting a link information notification message, i.e., a link interruption event notification message to the management server 440. In embodiments, the message can be designated a "LINK-INFO-NOTI message." According to this, the management server 440 selects at least one candidate BS to be used for establishing the detour path through an algorithm to be described below, and delivers this information regarding the selected candidate BS to the BS A 421. After that, the BS A 421 selects one of the candidate BSs, e.g., the BS D 424, as a BS that will provide the detour path, and sets the detour path using the selected BS (e.g., the BS D 424). According to this, data transmission can be resumed between the BS A 421 and the BS B 422.

Each step of the aforementioned detour path determination process is described below.

If each BS is powered-on through power applying or is waken-up in a power saving mode, each BS delivers neighboring BS information and wireless link information to a management server. Information items delivered to the management server may include at least one of a BS location (e.g., a latitude, a longitude, an altitude, or the like), and RF chain setting and state information (e.g., an RF chain count, an RF chain identifier, an RF chain coverage, an RF chain availability, or the like).

The management server may store and manages the information received from the BSs. The information of the BSs can be stored and managed in a form of a table. For example, the table can be given as in Table 1 below.

TABLE 1

| Base station | Location information | RF chain information | | | Neighbor information | Link quality |
|---|---|---|---|---|---|---|
| | | count | index | Coverage(degree) | state | | |
| BS1 | <latitude><longitude><altitude> | N | 1 | 0-119 | OK | BS2 | −70 |
| | | | 2 | 120-239 | NOK | BS3 | −80 |
| | | | ... | ... | ... | ... | ... |
| ... | ... | ... | ... | ... | ... | ... | ... |

In Table 1 above, the link quality can be exemplified as a Reference Signal Received Power (RSRP).

If an event of changing the information managed by the management server occurs, each BS reports the event occurrence and related information to the management server. Events requiring the reports can be defined differently according to an embodiment. For example, the events can be defined as at least one of events given in Table 2 below.

TABLE 2

| Event | Determination condition |
|---|---|
| Wireless link interruption | when continuous ARQ or H-ARQ failure is determined equal to or greater than threshold value |
| State change of RF chain | 1) when transiting from normal (OK) to abnormal (Non-OK) (e.g., hardware trouble, overload, etc.)<br>2) when transiting from abnormal (Non-OK) to normal (OK) (e.g., trouble recovery, overload release, etc.) |
| State change of wireless link | 1) when wireless link quality between source BS and destination BS decreases equal to or less than threshold value<br>2) when wireless link quality between source BS and destination BS increases equal to or greater than threshold value |

On the basis of the information reported from the BS, the management server updates the management table. At this time, if receiving a message of notifying a wireless link interruption event, the management server determines a detour path according to the following algorithm based on the basis of the management table. The management server determines at least one BS capable of relaying data between a source BS and a destination BS. In an embodiment, the management server can determine at least one BS that will relay data as in FIG. 5 below.

Figure 5:
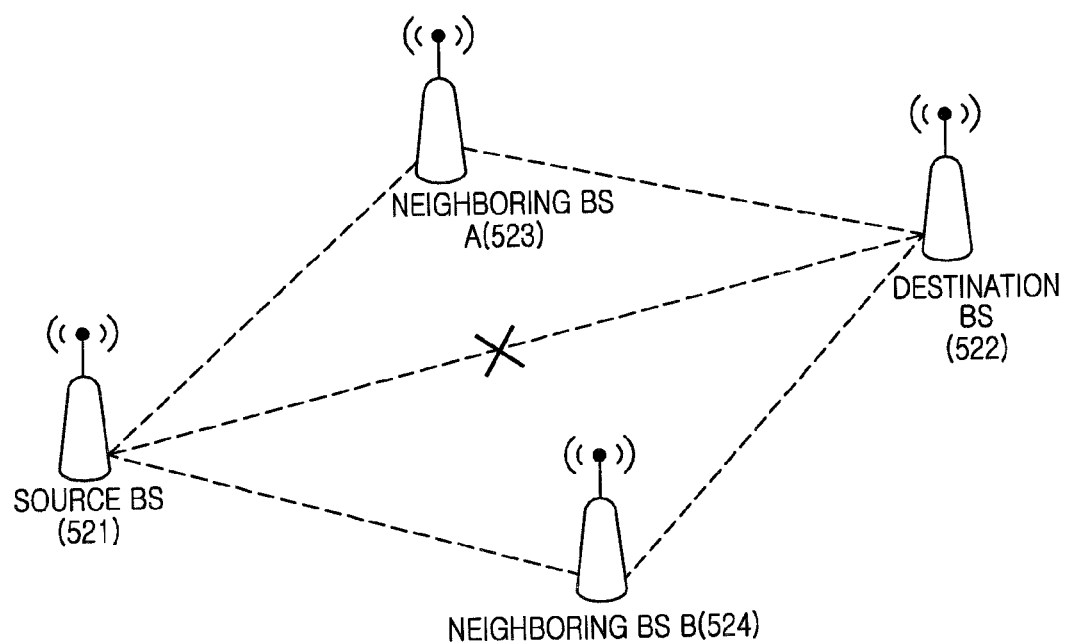
FIG. 5 is a diagram illustrating a method of selecting a neighboring BS and a candidate BS in a wireless communication system according to an embodiment of the present disclosure.

FIG. 5 is a diagram illustrating a method of selecting a neighboring BS and a candidate BS in a wireless communication system according to an embodiment of the present disclosure.

Referring to FIG. 5, the management server searches at least one neighboring BS of a source BS 521. Through this, a neighboring BS A 523 and a neighboring BS B 524 are selected. For example, the management server can search neighboring BSs on the basis of a distance from the source BS 521. In embodiments, the management server can select neighboring BSs from a list in an order of shortest distance, or can select neighboring BSs having distances equal to or less than a threshold value. However, in a case of selecting the neighboring BSs having the distances equal to or less than the threshold value, the management server may select neighboring BSs within a predefined maximum count. In embodiments, the management server determines whether each of the searched neighboring BSs 523 and 524 is wirelessly connectable with the source BS 521 and the destination BS 522 on the basis of coverage per RF chain, of a state per RF chain, and of a wireless link quality per RF chain. In an embodiment, the management server selects as at least one candidate BS the neighboring BS 523 or 524 satisfying a reference from among the neighboring BSs 523 and 524. When the neighboring BS A 523 and the neighboring BS B 524 are all wirelessly connectable with the destination BS 522, the neighboring BS A 523 and the neighboring BS B 524 may be all considered as candidate BSs.

For example, if a detour path is configurable by 2-hop, and neighboring BSs capable of providing the detour path between a source BS and a destination BS are many, one or a plurality of candidate BSs can be determined according to a predefined reference. The predefined reference can be different according to an embodiment. For example, at least one of coverage per RF chain, a state per RF chain, a wireless link quality per RF chain, and a distance between BSs can be considered. A determination of each reference can be provided as in Table 3 below.

TABLE 3

| Reference | Determination items |
|---|---|
| Coverage per RF chain | Whether coverage per RF chain possessed by neighboring BS is suitable to communication between source BS and destination BS. |

TABLE 3-continued

| Reference | Determination items |
|---|---|
| State per RF chain | Selecting normal RF chain enabling communication between source BS and destination BS among RF chains. |
| Link quality per RF chain | Considering link quality (e.g., SNR) between source BS and neighboring BS, and wireless quality between destination BS and neighboring BS. |
| Distance with source/destination BS | Selecting neighboring BS of relatively short distance with BS as candidate BS on the basis of location per BS managed by management server. |

The priority order of the aforementioned references can be defined in order of the coverage per RF chain, the state per RF chain, the wireless link quality per RF chain, and the distance between BSs. In embodiments, the selection of the candidate BS is as illustrated in FIG. 6 below.

Figure 6:
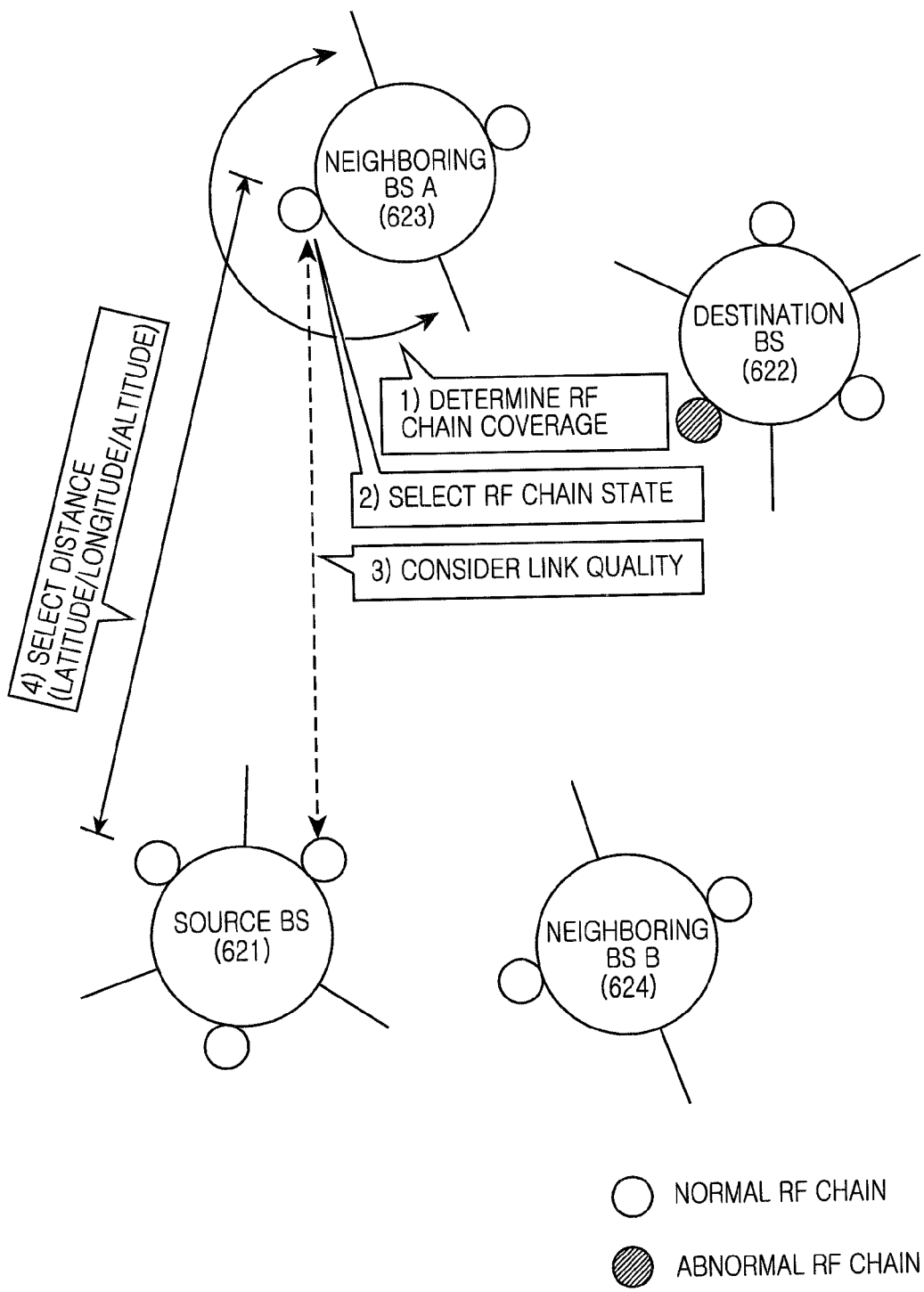
FIG. 6 is a diagram illustrating a method of applying a reference for candidate BS selection in a wireless communication system according to an embodiment of the present disclosure.

FIG. 6 is a diagram illustrating a method of applying a reference for candidate BS selection in a wireless communication system according to an embodiment of the present disclosure.

Referring to FIG. 6, a management server determines if coverage per RF chain possessed by each neighboring BS 623 or 624 is suitable to a source BS 621 and a destination BS 622, and selects RF chains whose coverage is suitable to the source BS 621 and the destination BS 622. That is, the management server excludes RF chains whose coverage does not include direction toward the source BS 621 or the destination BS 622. In an embodiment, the management server selects RF chains of communication-capable normal states from among the RF chains selected according to the coverage, and considers a link quality between the source BS 621 and the neighboring BS 623 and a link quality between the destination BS 622 and the neighboring BS 623 in performing communication using the selected RF chains. In other words, neighboring BSs of superior link qualities are selected. In embodiments, neighboring BSs of the number predefined in order of superior link quality or neighboring BSs having link qualities equal to or greater than a threshold value can be selected. However, if being based on the link quality equal to or greater than the threshold value, candidate BSs can be selected not to exceed a predefined maximum count. The link quality can include at least one of a Signal to Noise Ratio (SNR), a Signal to Interference plus Noise Ratio (SINR), a Carrier to Interference plus Noise Ratio (CINR), and a Received Signal Strength Indicator (RSSI). Finally, the management server selects as candidate BSs an "M" number of neighboring BSs whose distances are shortest on the basis of locations (e.g., latitudes, longitudes, and altitudes) of respective BSs. In embodiments, neighboring BSs in order of shortest distance, or neighboring BSs having distances equal to or greater than a threshold value, can be selected. However, if being based on the distances equal to or less than the threshold value, candidate BSs can be selected not to exceed a predefined maximum count.

In the aforementioned candidate BS selection, it can occur that a specific neighboring BS satisfies the aforementioned references in relation with a source BS but fails to satisfy the aforementioned references in relation with a destination BS. In contrast, it can occur that the specific neighboring BS fails to satisfy the aforementioned references in relation with the source BS but satisfies the aforementioned references in relation with the destination BS. In this case, the management server can select the neighboring BS satisfying the aforementioned references in relation with all of the source BS and the destination BS, as a candidate BS. At this time, the management server can exclude a neighboring BS failing to satisfy the aforementioned references in relation with the source BS in a process of searching the neighboring BSs.

If at least one candidate BS is selected as aforementioned, the management server delivers candidate BS information to the source BS through a backhaul link. If a detour path is equal to or is greater than 3-hop, the candidate BS information includes path information which should be transmitted between BSs in the management server. For example, the path information expresses a path in a way of "source BS→candidate BS A→candidate BS B→destination BS.

According to this, the source BS determines a detour path. For the detour path determination, the present disclosure proposes various embodiments. According to one embodiment of the present disclosure, the source BS can determine as the detour path a path going through a candidate BS provided in the management server as it is. According to another embodiment of the present disclosure, the source BS can measure a current wireless channel quality for candidate BSs provided in the management server, and determine as the detour path a path including a candidate BS providing the most superior wireless channel quality.

If the source BS determines the detour path, the wireless channel quality can be measured as follows. The source BS transmits a probe request packet to the destination BS through each of a plurality of candidate BSs. In response to the probe request packet, the destination BS transmits a probe response packet to the source BS through each of the candidate BSs. At this time, the detour path can be determined to be a path providing a fast response time of the probe response packet responsive to the probe request packet transmission per path.

In general, BSs do not have mobility. Accordingly, enough effect is expected by determining as the detour path the candidate BS provided in the management server as it is as in the former embodiment. However, in the event of a sudden change of a wireless channel environment, the latter embodiment would be able to provide a more stable effect than the former embodiment. Among the aforementioned two various embodiments, an embodiment applied to a system can be selected by a network worker, and can be changed according to policy in a system operating process.

If the detour path is determined as above, the source BS establishes a wireless link with the candidate BS, and transmits data to the destination BS through the detour path. If a direct communication-capable wireless link between the source BS and the destination BS is recovered in the future, the source BS and the destination BS release the detour path, and use the direct communication-capable wireless link.

According to another embodiment of the present disclosure, a detour path equal to or greater than 3-hop can be determined. For example, considering a S-hop detour path, the management server determines the 3-hop detour path according to the aforementioned same references and priority order, using the other neighboring BS having a 1-hop relation with a 1-hop neighboring BS. That is, the management server applies the aforementioned references to between a neighboring BS having a 1-hop relation with a 1-hop neighboring BS of the source BS, and the destination BS. In other words, when selecting a candidate BS for the 3-hop detour path, the management server selects a candidate BS for providing a 2-hop detour path between the neighboring BS of the source BS and the destination BS. For example, in FIG. 6, considering the 3-hop detour path going through the neighboring BS A 623, the reference is applied to between the neighboring BS A 623 and the destination BS 622.

In an embodiment, the management server confirms the remnant neighboring BSs excepting the destination BS and the source BS among neighboring BSs of the neighboring BS of the source BS. Herein, the present disclosure designates the remnant neighboring BSs excepting the destination BS and the source BS from among the neighboring BSs of the neighboring BS of the source BS, as "2-degree neighboring BSs." And, by applying the aforementioned references to the 2-degree neighboring BSs, the management server selects at least one candidate BS from among the 2-degree neighboring BSs. For description's convenience, the present disclosure designates the at least one candidate BS selected from among the 2-degree neighboring BSs, as a "2-degree candidate BS."

Figure 7:
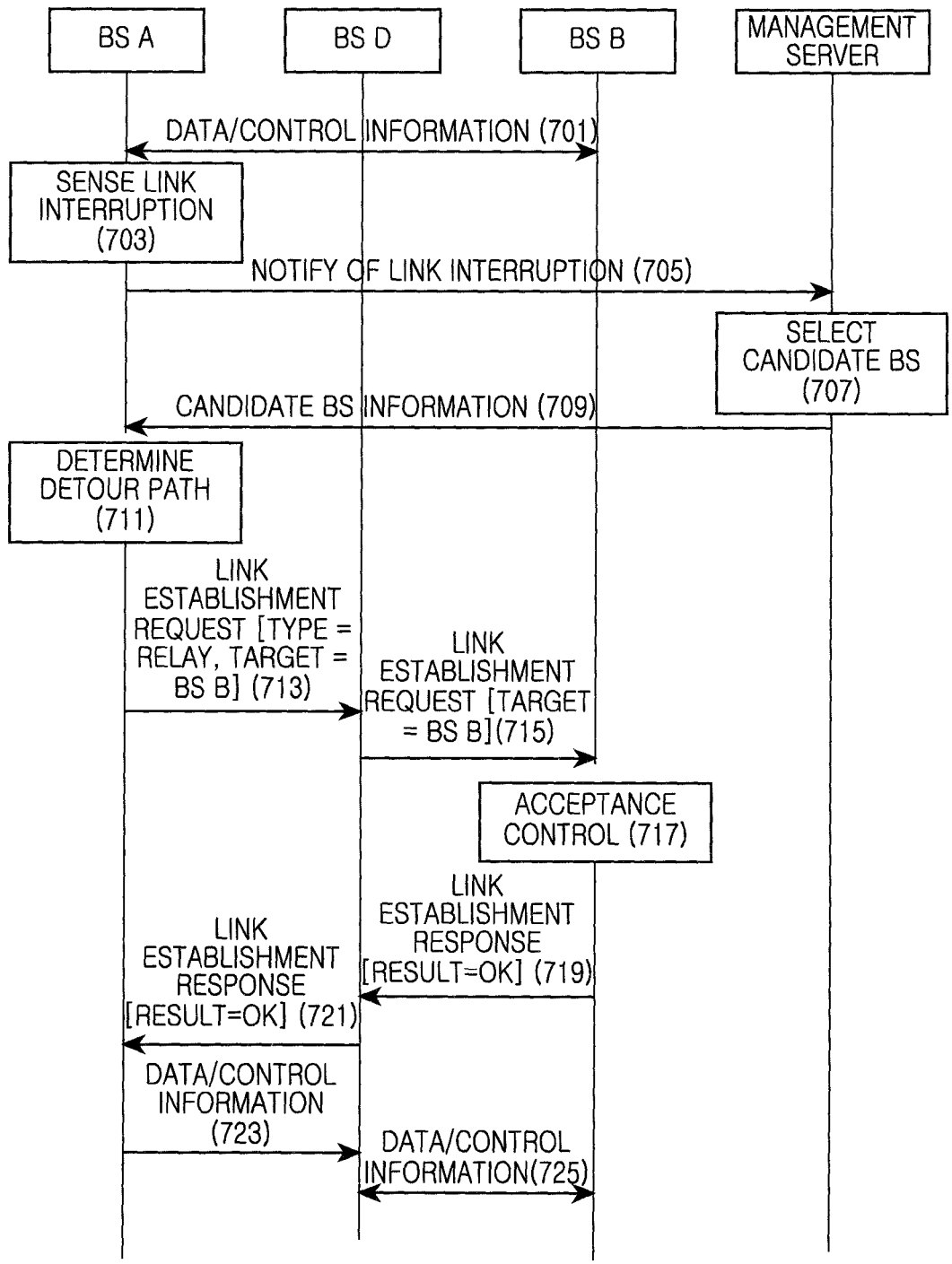
FIG. 7 is a ladder diagram illustrating a signal exchange for a detour path determination in a wireless communication system according to an embodiment of the present disclosure.

FIG. 7 is a ladder diagram illustrating a signal exchange for a detour path determination in a wireless communication system according to an embodiment of the present disclosure.

Referring to FIG. 7, in operation 701, a BS A and a BS B perform direct communication of data and control information through a wireless link. That is, the BS A and the BS B construct a fronthaul using a direct link. In embodiments, it is assumed that the BS A is a source BS, and the BS B is a destination BS.

In operation 703, the BS A senses link interruption. For example, if a continuous Automatic Repeat reQuest (ARQ) or Hybrid ARQ (HARQ) failure is determined equal to or greater than a threshold value, the BS A can determine the link interruption.

In operation 705, the BS A sensing the link interruption transmits a link information notification to a management server. The link information notification is for notifying the occurrence of a link interruption event, and is delivered to the management server through a backhaul. Further to the occurrence of the link interruption event, even a link quality can be delivered together.

In operation 707, the management server selects at least one candidate BS. At this time, according to an embodiment of the present disclosure, in a case where the source BS determines as a detour path the candidate BS selected by the management server as it is, the management server selects the candidate BS. According to another embodiment of the present disclosure, in a case where the source BS directly determines a detour path among candidate BSs selected by the management server, the management server selects one or a plurality of candidate BSs.

In operation 709, the management server transmits information about the selected at least one candidate BS to the BS A. The information about the candidate BS includes a value capable of identifying a BS, such as an index of each candidate BS, a BS identifier, an IP address, and the like. Also, if the detour path going through the candidate BS is equal to or is greater than 3-hop, the information about the candidate BS can include path information.

In operation 711, the BS A determines the detour path. According to an embodiment of the present disclosure, the BS A can determine as the detour path a path going through one candidate BS provided by the management server. Alternatively, according to another embodiment of the present disclosure, the BS A can determine as the detour path a path going through one candidate BS among a plurality of candidate BSs provided by the management server. At this time, the detour path is determined to be a BS D.

In operation 713, the BS A transmits a link establishment request to the BS D. The link establishment request indicates (e.g., type=relay) that it is, not for communication with the BS D, for a detour path that will relay communication with other BS, and indicates (e.g., target=BS B) that a destination of the detour path is the BS B.

In operation 715, the BS D transmits a link establishment request (target=BS B) to the BS B. That is, the BS D recognizes that the BS A intends to perform communication with the BS B through the detour path going through itself, and the BS D transmits the link establishment request for establishing the detour path with the BS A, to the BS B.

In operation 717, the BS B performs acceptance control. The acceptance control signifies a procedure of determining if the BS B can permit the establishment of a wireless link with the BS D. At this time, the acceptance control is permitted.

In operation 719, the BS B transmits a link establishment response (result=OK) to the BS D. Next, in operation 721, the BS D transmits a link establishment response (result=OK) to the BS A. The link establishment response indicates that link establishment is accepted.

In operation 723, the BS A transmits data/control information to the BS D to resume communication with the BS B. If so, in operation 725, the BS D delivers the data/control information to the BS B. That is, the BS A resumes communication with the BS B through the detour path going through the BS D. That is, the BS A and the BS B construct a fronthaul using the detour path going through the BS D. Though not illustrated in FIG. 7, if a direct wireless link between the BS A and the BS B is recovered, the BS A and the BS B release the detour path going through the BS D, and perform communication with each other using the direct wireless link.

Below, the present disclosure describes operations and constructions of the BS and the management server of recovering the interrupted wireless link as aforementioned with reference to the drawings.

Figure 8:
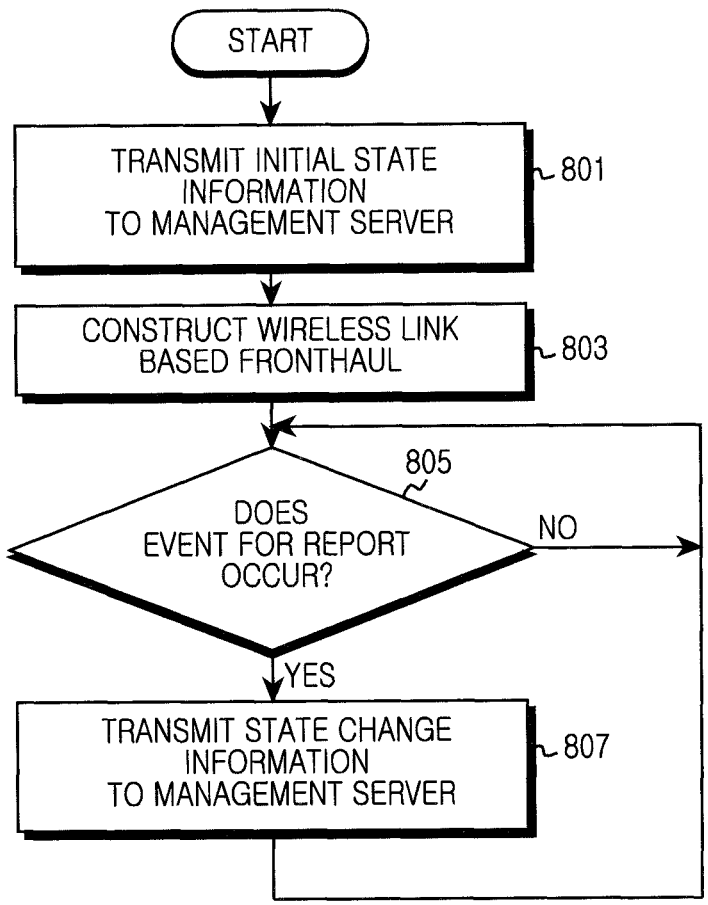
FIG. 8 is a flowchart illustrating an operation procedure of a BS for fronthaul-related information management in a wireless communication system according to an embodiment of the present disclosure.

FIG. 8 is a flowchart illustrating an operation procedure of a BS for fronthaul-related information management in a wireless communication system according to an embodiment of the present disclosure.

Referring to FIG. 8, in operation 801, the BS transmits information related to wireless link based fronthaul construction to a management server. In embodiments, the information related to the wireless link based fronthaul construction can include initial state information, e.g., at least one of a value indicating a location of the BS, a value indicating a hardware performance/state of the BS, and a value indicating a wireless link state/quality of the BS with other BSs. The hardware performance can include an RF chain count and a coverage area per RF chain. The wireless link state can include a neighboring BS connectable with the BS, and a link quality of the BS with the neighboring BS. Operation 801 can be performed soon after a power-on or a wake-up of the BS. Herein, the information related to the fronthaul construction transmitted soon after the power-on or the wake-up may be designated "initial state information."

Next, the BS proceeds to operation 803 and constructs a wireless link based fronthaul. To construct the wireless link based fronthaul, the BS can transmit a message for fronthaul construction to the management server and then, perform signaling for wireless link establishment with other BSs that are notified from the management server. Alternatively, the BS can directly perform signaling for wireless link establishment with other BSs, without a request to the management server.

After that, the BS proceeds to operation 805 and determines if an event for a report to the management server takes place. The event for the report can be defined differently according to an embodiment. For example, the event for the report can include at least one of wireless link interruption, an RF chain state change, and a link state change. In an embodiment, the event can be defined as in Table 3 above.

If the event for the report takes place, the BS proceeds to operation 807 and transmits information notifying a state change causing the event, to the management server. For convenience herein, the information notifying the state change is designated "state change information." The state change information can include at least one of a value notifying a counterpart BS interrupting a wireless link, a value notifying a current state of an RF chain, and a value notifying a quality of a changed wireless link.

Figure 9:
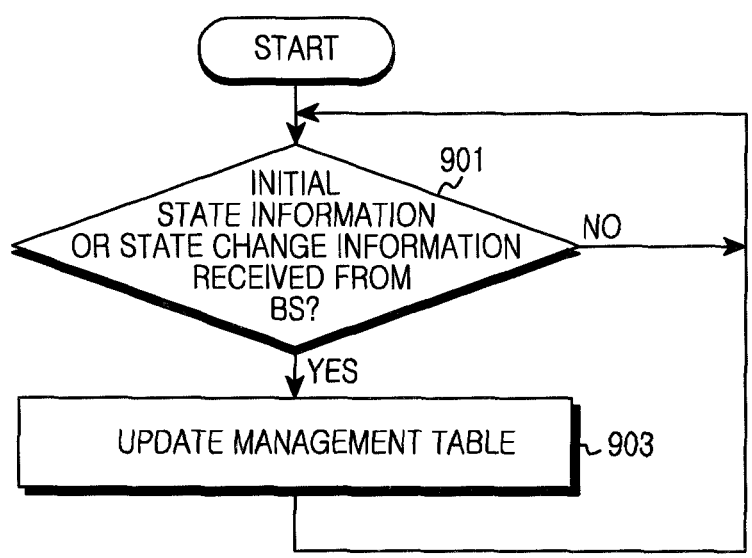
FIG. 9 is a flowchart illustrating an operation procedure of a management server for fronthaul-related information management in a wireless communication system according to an embodiment of the present disclosure.

FIG. 9 is a flowchart illustrating an operation procedure of a management server for fronthaul-related information management in a wireless communication system according to an embodiment of the present disclosure.

Referring to FIG. 9, in operation 901, the management server determines if initial state information or state change information is received from a BS. The initial state information is provided upon a power-on or a wake-up of the BS, and includes values related to fronthaul construction of the BS. The state change information is for informing a change of information about a BS managed by the management server, and includes values related to a changed item.

If the initial state information or the state change information is received from the BS, the management server proceeds to operation 903 and updates a management table. That is, if the initial state information is received, the management server adds a record for the BS to the management table and registers the received information to the management table. Alternately, if the state change information is received, the management server substitutes a received value for a value of an item changed in a record of the BS. For example, the management table can be constructed as in Table 1 above.

Figure 10:
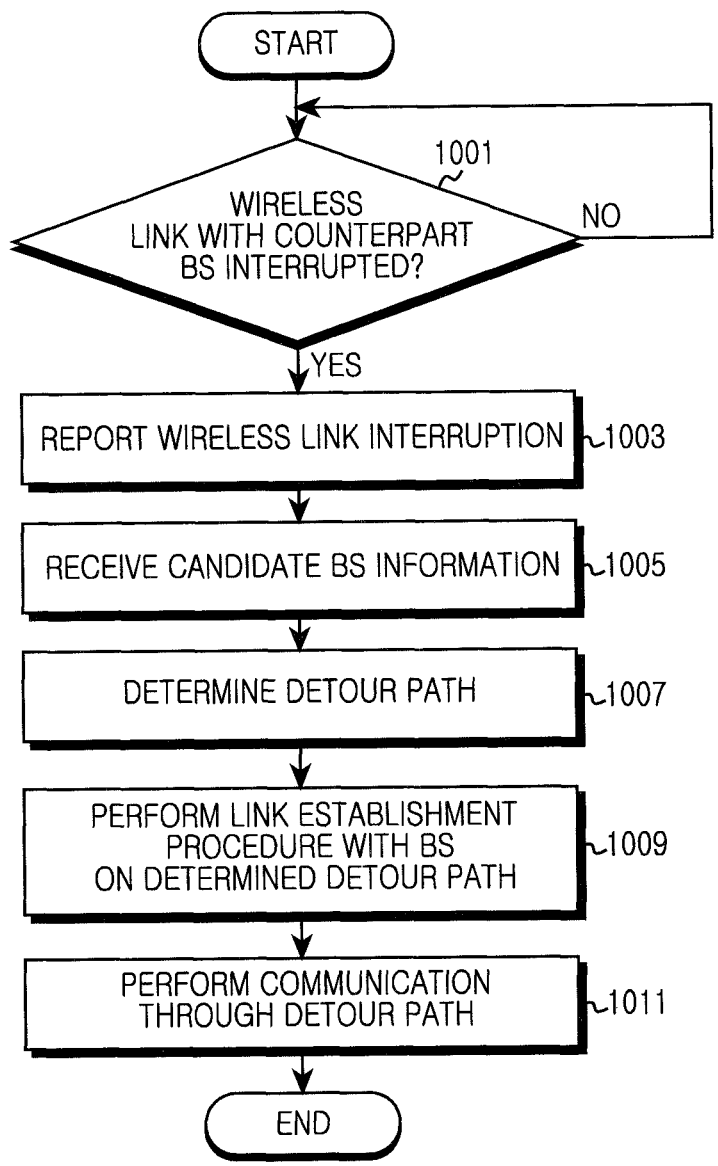
FIG. 10 is a flowchart illustrating an operation procedure of a BS for a detour path determination in a wireless communication system according to an embodiment of the present disclosure.

FIG. 10 is a flowchart illustrating an operation procedure of a BS for a detour path determination in a wireless communication system according to an embodiment of the present disclosure.

Referring to FIG. 10, in operation 1001, the BS determines wireless link interruption with a counterpart BS. That is, the BS determines the wireless link interruption while performing direct communication with the counterpart BS through a wireless link. If an ARQ or HARQ failure occurs equal to or greater than a predefined count, the wireless link interruption can be determined.

If the wireless link is interrupted, the BS proceeds to operation 1003 and transmits a report on the wireless link interruption to the management server. In other words, the BS transmits the management server a link information notification message of notifying the occurrence of a wireless link interruption event through a backhaul link. At this time, the link information notification message can include a link quality further to the occurrence of the wireless link interruption event.

Next, the BS proceeds to operation 1005 and receives information about at least one candidate BS from the management server. The candidate BS is selected by the management server, and represents a neighboring BS capable of establishing a physical connection with the counterpart BS among neighboring BS of the BS.

After that, the BS proceeds to operation 1007 and determines a detour path. According to an embodiment of the present disclosure, the BS can determine as the detour path a path going through a candidate BS provided by the management server. According to another embodiment of the present disclosure, the BS can determine as the detour path a path going through one candidate BS among a plurality of candidate BSs provided by the management server. In a case where the BS determines as the detour path one of the plurality of candidate BSs, the BS can determine the detour path on the basis of a channel quality. In an embodiment, the BS can transmit probe packets targeting the counterpart BS through paths going through the plurality of candidate BSs respectively, and determine as the detour path a path through which a response packet to the probe packet is received within the shortest time, from among the paths going through the plurality of candidate BSs respectively.

After determining the detour path, the BS proceeds to operation 1009 and performs a link establishment procedure with a BS that is on the determined detour path. That is, the BS transmits a link establishment request message to the BS that is on the detour path, and receives a link establishment response message from the BS that is on the detour path. In embodiments, the link establishment request message indicates that it is, not for communication with the BS being on the detour path, for the detour path that will relay communication with the counterpart BS, and indicates that a destination of the detour path is the counterpart BS.

Next, the BS proceeds to operation 1011 and performs communication with the counterpart BS through the detour path. That is, the BS and the counterpart BS construct a fronthaul using the detour path.

After that, though not illustrated in FIG. 10, if a direct wireless link between the BS and the counterpart BS is recovered, the BS can release the detour path, and perform communication with the counterpart BS using the recovered direct wireless link.

Figure 11:
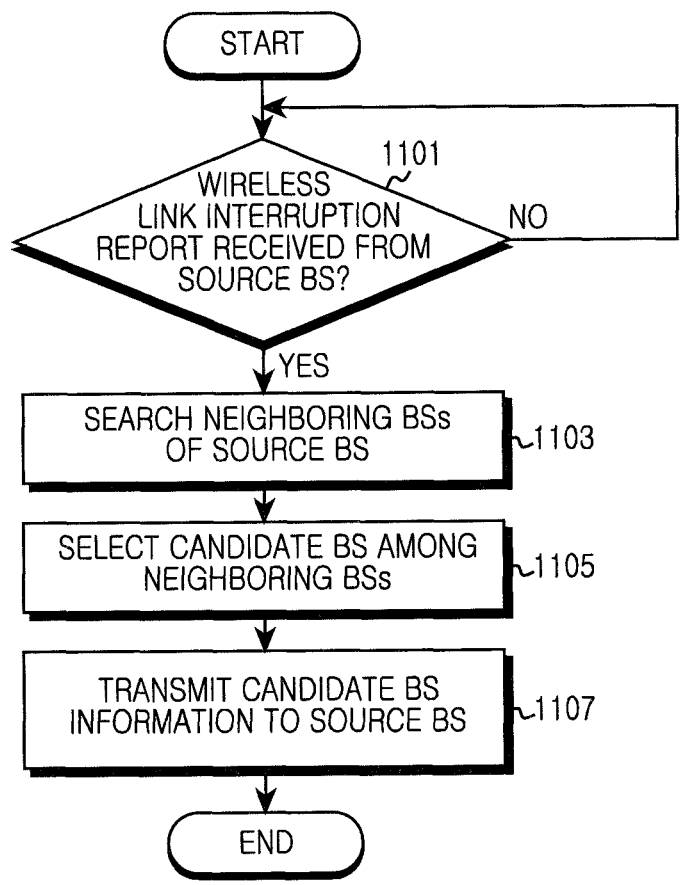
FIG. 11 is a flowchart illustrating an operation procedure of a management server for a detour path determination in a wireless communication system according to an embodiment of the present disclosure.

FIG. 11 is a flowchart illustrating an operation procedure of a management server for a detour path determination in a wireless communication system according to an embodiment of the present disclosure.

Referring to FIG. 11, in operation 1101, the management server determines if a report on wireless link interruption report is received from a source BS. In other words, the management server determines if a link information notification message of notifying the occurrence of a wireless link interruption event is received through a backhaul link. At this time, the link information notification message can include a link quality further to the occurrence of the wireless link interruption event.

If the report on the wireless link interruption is received from the source BS, the management server proceeds to operation 1103 and searches neighboring BSs of the source BS. That is, the management server searches at least one neighboring BS being wireless link connectable with the source BS. For example, the management server can search the neighboring BSs by means of a management table.

In an embodiment, the management server proceeds to operation 1105 and selects at least one candidate BS from among the neighboring BSs. The candidate BS represents a candidate of a BS that will provide a detour path between the source BS and a destination BS. To select the candidate BS, the management server can consider at least one of coverage per RF chain of each neighboring BS, a state per RF chain, a wireless link quality per RF chain, and a distance between BSs. At this time, the priority order of the aforementioned references can be defined in order of the coverage per RF chain, the state per RF chain, the wireless link quality per RF chain, and the distance between the BSs. According to an embodiment of the present disclosure, if the source BS determines as the detour path a path going through a candidate BS provided in the management server as it is, the management server selects the candidate BS. According to another embodiment of the present disclosure, if the source BS determines as the detour path a path going through one of a plurality of candidate BSs provided in the management server, the management server selects the one or plurality of candidate BSs.

After selecting the candidate BS, the management server proceeds to operation 1107 and transmits information about the candidate BS to the source BS. The information about the candidate BS includes a value capable of identifying a BS, such as an index of each candidate BS, a BS identifier, an IP address and the like. Also, if the detour path going through the candidate BS is equal to or is greater than 3-hop, the information about the candidate BS can include path information.

The embodiment illustrated in FIG. 11 considers only a 2-hop path as the detour path. But, according to another embodiment of the present disclosure, even a path equal to or greater than 3-hop can be considered as the detour path. In this case, the management server selects a 2-degree candidate BS that will provide the path equal to or greater than the 3-hop. In a case of further considering the 3-hop path, a procedure illustrated in FIG. 12 below can be further included in the procedure illustrated in FIG. 11.

Figure 12:
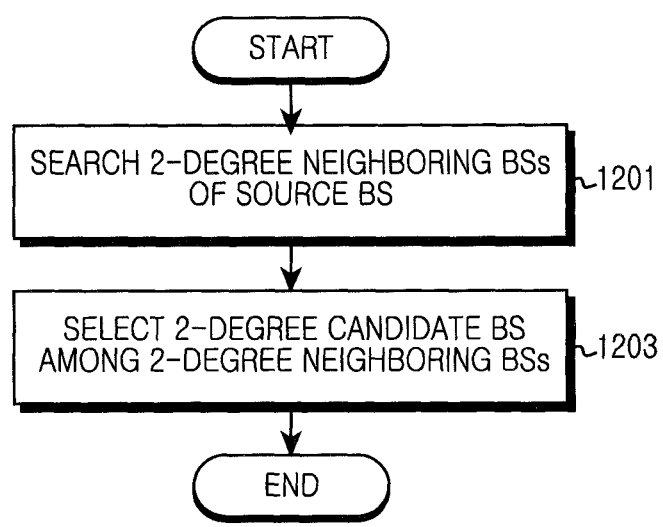
FIG. 12 is a flowchart illustrating an operation procedure of a management server for a detour path determination in a wireless communication system according to an embodiment of the present disclosure.

FIG. 12 is a flowchart illustrating an operation procedure of a management server for a detour path determination in a wireless communication system according to an embodiment of the present disclosure.

Referring to FIG. 12, in operation 1201, the management server searches 2-degree neighboring BSs of a source BS. The 2-degree neighboring BSs represent the remnant neighboring BSs excepting a destination BS and the source BS among neighboring BSs of a neighboring BS of the source BS. That is, the management server searches at least one 2-degree neighboring BS that is wireless link connectable with the neighboring BS of the source BS. For example, the management server can search the 2-degree neighboring BSs by means of a management table.

In an embodiment, the management server proceeds to operation 1203 and selects a 2-degree candidate BS from among the searched 2-degree neighboring BSs. The 2-degree candidate BS represents a candidate of a BS that will provide a detour path between the neighboring BS of the source BS and the destination BS. References for selection of the 2-degree candidate BS are the same as the references for selection of the candidate BS described in FIG. 11. That is, to select the 2-degree candidate BS, the management server considers at least one of coverage per RF chain of each neighboring BS, a state per RF chain, a wireless link quality per RF chain, and a distance between BSs. At this time, the priority order of the aforementioned references can be defined in order of the coverage per RF chain, the state per RF chain, the wireless link quality per RF chain, and the distance between the BSs.

The embodiment illustrated in FIG. 12 represents a process of selecting a 2-degree candidate BS for a 3-hop detour path. Whether to consider the 3-hop detour path can be determined according to policy of a network worker or determination of the management server. For example, when it is impossible to provide a 2-hop detour path or there is not a 2-hop detour path satisfying a predetermined quality, the management server can select the 2-degree candidate BS that will provide the 3-hop detour path. Alternatively, to consider various other detour paths, the management server can select the 2-degree candidate BS that will provide the 3-hop detour path always, further to the 2-hop detour path.

The aforementioned process of selecting the 2-degree candidate BS for the 3-hop detour path may also be applicable to a detour path equal to or greater than 4-hop. That is, similar to the aforementioned process, the management server may select an (N–1)-degree neighboring BS and an (N–1)-degree candidate BS for an N-hop detour path.

Figure 13:
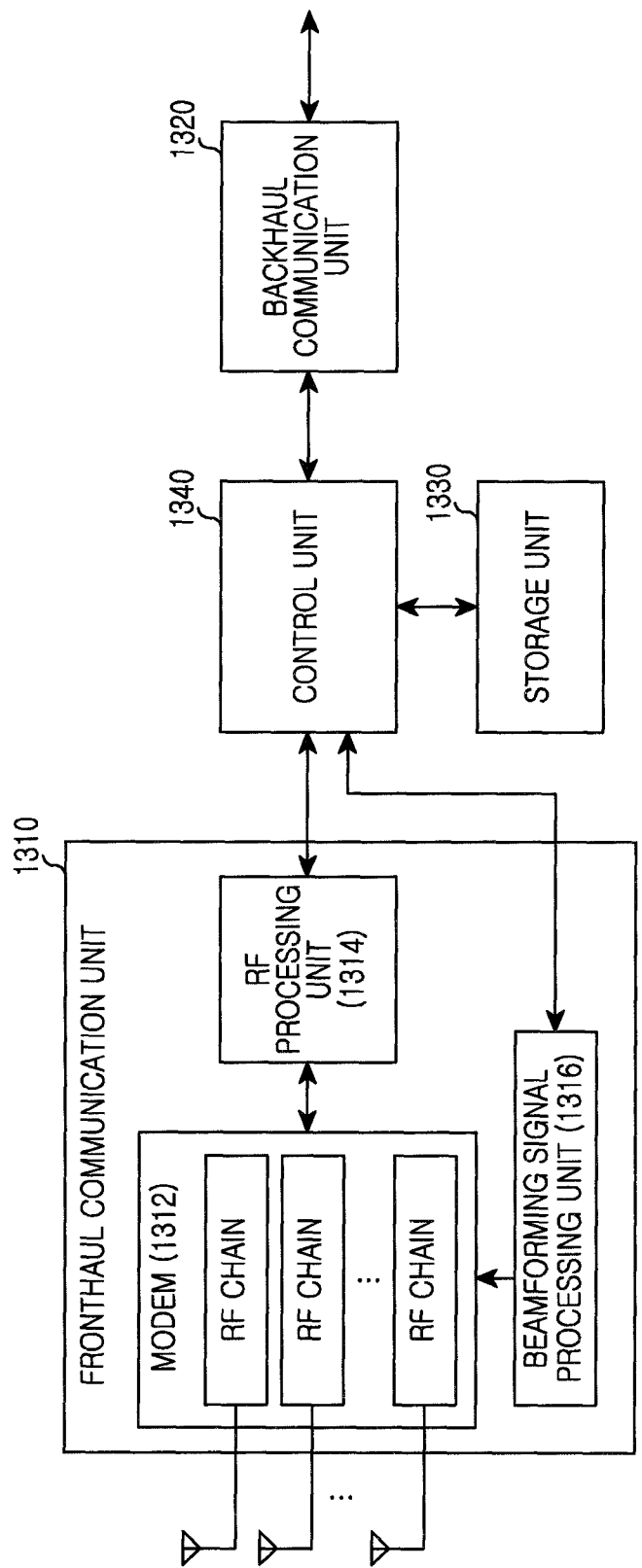
FIG. 13 is a block diagram illustrating a construction of a BS in a wireless communication system according to an disclosure embodiment of the present disclosure.

FIG. 13 is a block diagram illustrating a construction of a BS in a wireless communication system according to an embodiment of the present disclosure.

Referring to FIG. 13, the BS includes a fronthaul communication unit 1310, a backhaul communication unit 1320, a storage unit 1330, and a control unit 1340.

The fronthaul communication unit 1310 provides an interface for performing communication with other BSs through a wireless link. In an embodiment, the fronthaul communication unit 1310 can include a modem 1312, an RF processing unit 1314, and a beamforming signal processing unit 1316. The fronthaul communication unit 1310 can be a part of a device for performing wireless communication with an MS, or can be a device exclusively allocated for a fronthaul. If the fronthaul communication unit 1310 is the part of the device for performing the wireless communication with the MS, the fronthaul communication unit 1310 can be used for the wireless communication with the MS.

The modem 1312 performs a function of conversion between a baseband signal and a bit stream according to the physical layer standard of the system. For example, in a case where following on an Orthogonal Frequency Division Multiplexing (OFDM) scheme, at data transmission, the modem 1312 creates complex symbols by encoding and modulating a transmission bit stream, maps the complex symbols to subcarriers, and then constructs OFDM symbols through Inverse Fast Fourier Transform (IFFT) operation and Cyclic Prefix (CP) insertion. At data reception, the modem 1312 divides a baseband signal in the unit of OFDM symbol, restores signals mapped to subcarriers through Fast Fourier Transform (FFT) operation, and then restores a reception bit stream through demodulation and decoding.

The RF processing unit 1314 performs a function for transmitting/receiving a signal through a wireless channel such as signal band conversion, amplification, and the like. That is, the RF processing unit 1314 up converts a baseband signal provided from the modem 1312 into an RF band signal and then transmits the RF band signal through antennas, and down converts an RF band signal received through the antennas into a baseband signal. For example, the RF processing unit 1314 can include an amplifier, a mixer, an oscillator, a Digital to Analog Converter (DAC), an Analog to Digital Converter (ADC), or the like. The RF processing unit 1314 can include a plurality of physical devices. To perform beamforming, the RF processing unit 1314 includes a plurality of RF chains.

The beamforming signal processing unit 1316 controls a gain dependent on the directivity of a transmit/receive signal. The beamforming signal processing unit 1316 can perform digital beamforming or analog beamforming according to a beamforming execution time point. A difference between the digital beamforming and the analog beamforming is whether a beamforming parameter of determining beam direction is determined before the DAC or is applied after the DAC. Accordingly, in a case of the digital beamforming, the beamforming signal processing unit 1316 controls the beamforming parameter to be multiplied before the DAC in each RF chain within the RF processing unit 1314. In contrast, in a case of the analog beamforming, the beamforming signal processing unit 1316 controls the beamforming parameter to be multiplied after the DAC and before the amplifier in each RF chain within the RF processing unit 1314. In an embodiment, at signal transmission, in a case of the analog beamforming, the beamforming signal processing unit 1316 adjusts a magnitude or phase of each signal for transmitting the beamforming parameter multiplied after the DAC. At signal transmission, in a case of the digital beamforming, the beamforming signal processing unit 1316 adjusts a magnitude or phase of each signal for transmitting the beamforming parameter multiplied before the DAC. The beamforming signal processing unit 1316 and the RF processing unit 1314 can be constructed as one physical block.

The backhaul communication unit 1320 provides an interface for connecting to an IP network via an upper node or directly. That is, the backhaul communication unit 1320 converts a bit stream transmitted to the IP network into a physical signal, and converts a physical signal received from the IP network into a bit stream.

The storage unit 1330 stores data of a basic program for an operation of the BS, an application program, setting information, and the like. Particularly, the storage unit 1330 can store program codes for constructing a wireless link based fronthaul.

The control unit 1340 controls the general operations of the BS. For example, the control unit 1340 transmits/receives a signal through the fronthaul communication unit 1310 and the backhaul communication unit 1320. Also, the control unit 1340 writes/reads data in/from the storage unit 1330. The control unit 1340 can include at least one processor executing a program code stored in the storage unit 1330 or include a processor performing a predefined function. According to an embodiment of the present disclosure, the control unit 1340 constructs a wireless link based fronthaul, and provides fronthaul-related information to the management server and, upon wireless link interruption, determines a detour path. For example, the control unit 1340 controls the BS to perform the procedures illustrated in FIG. 8 and FIG. 10. An operation of the control unit 1340 according to an embodiment of the present disclosure is given as follows.

Upon a power-on or a wake-up, the control unit 1340 transmits initial state information to the management server. In embodiments, the initial state information can include a value indicating a location of the BS, a value indicating a hardware performance/state of the BS, and a value indicating a wireless link state/quality of the BS with other BSs. And, the control unit 1340 constructs wireless link based fronthauls with other BSs. After that, if an event for a report occurs, the control unit 1340 transmits information notifying a state change causing the event, i.e., state change information to the management server. The state change information can include at least one of a value notifying a counterpart BS interrupting a wireless link, a value notifying a current state of an RF chain, and a value notifying a changed quality of the wireless link.

If the wireless link interruption is determined, the control unit 1340 transmits a report on the wireless link interruption to the management server through the backhaul communication unit 1320. After that, if information about at least one candidate BS is received from the management server, the control unit 1340 determines a detour path. According to an embodiment of the present disclosure, the control unit 1340 can determine as the detour path a path going through a candidate BS provided by the management server. According to another embodiment of the present disclosure, the control unit 1340 can determine as the detour path a path going through one candidate BS among a plurality of candidate BSs provided by the management server. If determining one of the plurality of candidate BSs as the detour path, the control unit 1340 can determine the detour path on the basis of a channel quality. After determining the detour path, the control unit 1340 performs a link establishment procedure with a BS being on the determined detour path, and performs communication with the counterpart BS through the detour path. In an embodiment, if a direct wireless link between the BS and the counterpart BS is recovered, the control unit 1340 releases the detour path, and performs communication with the counterpart BS using the direct wireless link.

Figure 14:
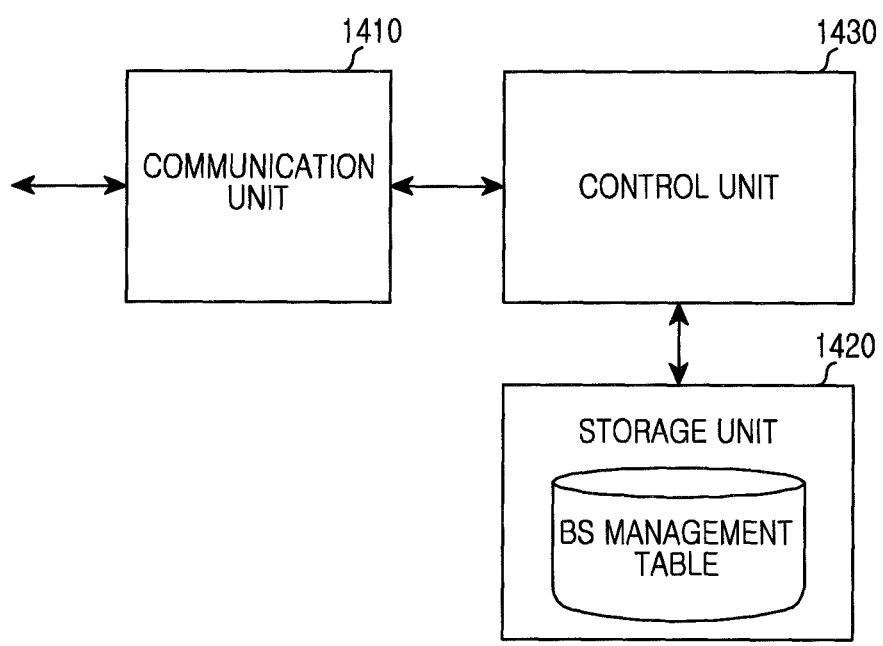
FIG. 14 is a block diagram illustrating a construction of a management server in a wireless communication system according to an embodiment of the present disclosure.

FIG. 14 is a block diagram illustrating a construction of a management server in a wireless communication system according to an embodiment of the present disclosure.

Referring to FIG. 14, the management server includes a communication unit 1410, a storage unit 1420, and a control unit 1430.

The communication unit 1410 provides an interface for connecting to an IP network. That is, the communication unit 1410 converts a bit stream transmitted to the IP network into a physical signal, and converts a physical signal received from the IP network into a bit stream.

The storage unit 1420 stores data of a basic program for an operation of the management server, an application program, setting information, and the like. Particularly, the storage unit 1420 stores a management table registering information of BSs. For example, the management table can be constructed as in Table 1 above.

The control unit 1430 controls the general operations of the management server. For example, the control unit 1430 transmits/receives a signal through the communication unit 1410. In embodiments, the control unit 1430 writes/reads data in/from the storage unit 1420. The control unit 1430 can include at least one processor executing a program code stored in the storage unit 1420 or include a processor performing a predefined function. According to an embodiment of the present disclosure, the control unit 1430 manages information related to a wireless link based fronthaul, and determines a candidate BS for a detour path upon wireless link interruption between BSs in the fronthaul. For example, the control unit 1430 controls the management server to perform the procedures illustrated in FIG. 9, FIG. 11, and FIG. 12. In an embodiment, an operation of the control unit 1430 according to an embodiment of the present disclosure is given as follows.

If initial state information is received from a BS, the control unit 1430 adds a record for the BS to the management table stored in the storage unit 1420, and registers the received information to the management table. Alternatively, if state change information is received from the BS, the control unit 1430 substitutes a received value for a value of an item changed in a record of the BS.

If the report on the wireless link interruption is received from a source BS, the control unit 1430 searches neighboring BSs of the source BS using the management table. And, the control unit 1430 selects at least one candidate BS from among the searched neighboring BSs. To select the candidate BS, the control unit 1430 considers at least one of coverage per RF chain of each neighboring BS, a state per RF chain, a wireless link quality per RF chain, and a distance between BSs. According to an embodiment of the present disclosure, if the source BS determines as a detour path a path going through a candidate BS provided in the management server as it is, the control unit 1430 selects the candidate BS. According to another embodiment of the present disclosure, if the source BS determines as the detour path a path going through one of a plurality of candidate BSs provided in the management server, the control unit 1430 selects the one or plurality of candidate BSs. After selecting the candidate BS, the control unit 1430 transmits candidate BS information to the source BS.

According to another embodiment of the present disclosure, even paths equal to or greater than 3-hop can be considered as a detour path. In this case, the control unit 1430 searches 2-degree neighboring BSs of the source BS, and selects a 2-degree candidate BS from among the searched 2-degree neighboring BSs. References for selection of the 2-degree candidate BS are the same as the references for selection of the candidate BS for the 2-hop detour path. That is, if selecting a candidate BS for a 3-hop detour path, the control unit 1430 can select a candidate BS that will provide the 3-hop detour path between the source BS and the destination BS, by selecting at least one candidate BS for providing a 2-hop detour path between the neighboring BS of the source BS and the destination BS in the same scheme as the aforementioned reference.

Whether to consider the 3-hop detour path can be determined according to a policy of a network worker or determination of the management server. For example, when it is impossible to provide a 2-hop detour path or there is not a 2-hop detour path satisfying a predetermined quality, the control unit 1430 can select the 2-degree candidate BS that will provide the 3-hop detour path. Alternatively, to consider various other detour paths, the control unit 1430 can select the 2-degree candidate BS that will provide the 3-hop detour path always, further to the 2-hop detour path.

Also, the aforementioned process of selecting the 2-degree candidate BS for the 3-hop detour path is similarly extensible even to a detour path equal to or greater than 4-hop. That is, similarly with the aforementioned process, the control unit 1430 can select an (N−1)-degree neighboring BS and an (N−1)-degree candidate BS for an N-hop detour path.

Various embodiments of the present disclosure propose a technique of self recovery of a wireless link in a system communicating using a wireless link between BSs. If the wireless link is automatically established as in the present disclosure, the intervention of a worker is unnecessary, so CAPEX and OPEX are saved. Also, the present disclosure solves the conventional disadvantages such as the waste of radio resources, a control message overhead, a long delay time for detour path setting, and the like.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a base station (BS) in a wireless communication system supporting a wireless link based communication between BSs, the method comprising:
    transmitting, if a wireless link between the BS and a counterpart BS is interrupted, a report on the wireless link interruption to a management server;
    receiving information for a detour path between the BS and the counterpart BS from the management server, the received information including at least one candidate BS for the detour path;
    determining a detour path with the counterpart BS based on the information about the at least one candidate BS; and
    performing communication between the BS and the counterpart BS through the detour path.

2. The method of claim 1, wherein the determining of the detour path comprises determining, as the detour path, a path going through one candidate BS received from the management server.

3. The method of claim 1, wherein the determining of the detour path comprises determining, as the detour path, a path going through one of a plurality of candidate BSs received from the management server.

4. The method of claim 3, wherein the determining of the detour path further comprises:
    transmitting probe packets targeting the counterpart BS through paths going through the plurality of candidate BSs respectively; and
    determining as the detour path a path through which a response packet to the probe packet is received within the shortest time, from among the paths going through the plurality of candidate BSs respectively.

5. The method of claim 1, further comprising, if a direct wireless link with the counterpart BS is recovered, releasing the detour path.

6. The method of claim 1, further comprising, upon a power-on or a wake-up of the BS, transmitting information related to fronthaul construction to the management server,
    wherein the information related to the fronthaul construction comprises at least one of a value indicating a location of the BS, a value indicating a hardware performance/state of the BS, and a value indicating a wireless link state/quality of the BS with other BSs.

7. The method of claim 1, further comprising, if an event for a report to the management server occurs, transmitting information notifying a state change causing the event to the management server, wherein the event comprises at least one of wireless link interruption, radio frequency (RF) chain state change, and link state change.

8. A method of a management server in a wireless communication system supporting a wireless link based communication between base stations (BSs), the method comprising:
if a report on wireless link interruption between a first BS and a second BS is received from the first BS, searching neighboring BSs of the first BS;
selecting, by the management server, at least one candidate BS that will provide a detour path between the first BS and the second BS, from among the neighboring BSs; and
transmitting information, by the management server, about the at least one candidate BS to the first BS.

9. The method of claim 8, wherein the selecting of the at least one candidate BS comprises selecting of the at least one candidate BS based on at least one of a coverage per radio frequency (RF) chain of the neighboring BSs, a state per RF chain of the neighboring BSs, a wireless link quality per RF chain of the neighboring BSs, and a distance between each of the neighboring BSs and the second BS.

10. The method of claim 9, wherein the selecting of the at least one candidate BS comprises:
excluding at least one RF chain for which coverage does not include the direction of the first BS or the second BS, or which is in an abnormal state, from among RF chains of the neighboring BSs;
selecting at least one RF chain for which link quality with the first BS and with the second BS is equal to or is greater than a threshold value, or from a list of an order of superior link quality; and
selecting, as the candidate BS, at least one neighboring BS from a list of an order of shortest distance from the first BS and the second BS, or which has a distance equal to or less than a threshold value, from among neighboring BSs possessing at least one of the selected at least one RF chain.

11. The method of claim 8, wherein the selecting of the at least one candidate BS comprises, when selecting a candidate BS for a 3-hop detour path, selecting at least one candidate BS for providing a 2-hop detour path between the neighboring BS of the first BS and the second BS.

12. The method of claim 8, wherein the information about the at least one candidate BS comprises at least one of a value capable of identifying a BS and a path corresponding to each candidate BS.

13. The method of claim 8, further comprising managing a management table which registers information of BSs related to fronthaul construction.

14. The method of claim 13, wherein the management table comprises at least one selected from among a value indicating a location of each BS, a value indicating a hardware performance/state of each BS, and a value indicating a wireless link state/quality of each BS with other BSs.

15. A base station (BS) apparatus in a wireless communication system supporting a wireless link based communication between BSs, the apparatus comprising:
a backhaul transceiver configured to:
transmit, if a wireless link between the BS and a counterpart BS is interrupted, a report on the wireless link interruption to a management server, and receive information for a detour path between the BS and the counterpart BS from the management server, the received information including at least one candidate BS for a detour path;
at least one processor configured to determine a detour path with the counterpart BS based on the at least one candidate BS; and
a fronthaul transceiver configured to perform communication between the BS and the counterpart BS through the detour path.

16. The apparatus of claim 15, wherein the at least one processor is further configured to determine, as the detour path, a path going through one candidate BS received from the management server.

17. The apparatus of claim 15, wherein the at least one processor is further configured to determine, as the detour path, a path going through one of a plurality of candidate BSs received from the management server.

18. The apparatus of claim 17, wherein the at least one processor is further configured to:
transmit probe packets targeting the counterpart BS through paths going through the plurality of candidate BSs, respectively, and
determine, as the detour path, a path through which a response packet to the probe packet is received within the shortest time, from among the paths going through the plurality of candidate BSs respectively.

19. The apparatus of claim 15, wherein, if a direct wireless link with the counterpart BS is recovered, the at least one processor is further configured to release the detour path.

20. The apparatus of claim 15,
wherein, upon a power-on or a wake-up of the BS, the backhaul transceiver is further configured to transmit information related to fronthaul construction to the management server, and
wherein the information related to the fronthaul construction comprises at least one of a value indicating a location of the BS, a value indicating a hardware performance/state of the BS, and a value indicating a wireless link state/quality of the BS with other BSs.

21. The apparatus of claim 15,
wherein, if an event for a report to the management server occurs, the backhaul transceiver is further configured to transmit information indicating a state change which caused the event to the management server, and
wherein the event comprises at least one of a wireless link interruption, a Radio Frequency (RF) chain state change, and a link state change.

22. A management server apparatus in a wireless communication system supporting a wireless link based communication between base stations (BSs), the apparatus comprising:
at least one processor configured to:
search, if a report on wireless link interruption between a first BS and a second BS is received from the first BS, neighboring BSs of the first BS, and
select, by the at least one processor of the management server apparatus, at least one candidate BS that will provide a detour path between the first BS and the second BS, from among the neighboring BSs; and
a transceiver configured to transmit information, by the transceiver of the management server apparatus, about the at least one candidate BS to the first BS.

23. The apparatus of claim 22, wherein the at least one processor is further configured to select the at least one candidate BS based on at least one of a coverage per radio frequency (RF) chain of the neighboring BSs, a state per RF chain of the neighboring BSs, a wireless link quality per RF chain of the neighboring BSs, and a distance between each of the neighboring BSs and the second BS.

24. The apparatus of claim 23, wherein the at least one processor is further configured to:
   exclude at least one RF chain for which coverage does not include the direction of the first BS or the second BS, or which is in an abnormal state, from among RF chains of the neighboring BSs,
   select at least one RF chain whose link quality with the first BS and the second BS is equal to or is greater than a threshold value, or which belongs to a list of an order of superior link quality, and
   select, as the candidate BS, at least one neighboring BS from a list of an order of shortest distance from the first BS and the second BS, or which has a distance equal to or less than a threshold value, from among neighboring BSs possessing at least one of the selected at least one RF chain.

25. The apparatus of claim 22, wherein, when selecting a candidate BS for a 3-hop detour path, the at least one processor is further configured to select at least one candidate BS for providing a 2-hop detour path between the neighboring BS of the first BS and the second BS.

26. The apparatus of claim 22, wherein the information about the at least one candidate BS comprises at least one of a value capable of identifying a BS and a path corresponding to each candidate BS.

27. The apparatus of claim 22, wherein the at least one processor is further configured to manage a management table which registers information of BSs related to fronthaul construction.

28. The management server apparatus of claim 27, wherein the management table comprises at least one of a value indicating a location of each BS, a value indicating a hardware performance/state of each BS, and a value indicating a wireless link state/quality of each BS with other BSs.

29. At least one non-transitory processor readable medium for storing a computer program of instructions configured to be readable by at least one processor for instructing the at least one processor to execute a computer process for performing the method as recited in claim 1.

* * * * *